United States Patent [19]

Parker

[11] Patent Number: 5,717,423
[45] Date of Patent: Feb. 10, 1998

[54] THREE-DIMENSIONAL DISPLAY

[75] Inventor: David N. Parker, Grand Island, N.Y.

[73] Assignee: Merltec Innovative Research, Grand Island, N.Y.

[21] Appl. No.: 366,981

[22] Filed: Dec. 30, 1994

[51] Int. Cl.[6] .................................. G09B 21/00
[52] U.S. Cl. ...................... 345/108; 345/156; 434/114
[58] Field of Search .................... 348/59; 345/158, 345/110, 87, 108, 205, 6, 184, 139, 31, 156; 359/466; 434/113, 114, 112; 395/119, 125; 340/407.1

[56] References Cited

U.S. PATENT DOCUMENTS

| | | | |
|---|---|---|---|
| 1,796,030 | 3/1931 | Kell | 345/110 |
| 3,594,787 | 7/1971 | Ickes | 340/407 |
| 4,191,945 | 3/1980 | Hannen | 340/407.1 |
| 4,551,717 | 11/1985 | Dreher | 345/170 |
| 4,644,326 | 2/1987 | Villalobos | 345/170 |
| 4,644,339 | 2/1987 | Ruder | 340/407 |
| 4,667,189 | 5/1987 | den Boer | 345/90 |
| 4,789,858 | 12/1988 | Fergason | 345/173 |
| 4,836,784 | 6/1989 | Burchart | 434/113 |
| 4,853,697 | 8/1989 | Pellizzari | 341/22 |
| 4,855,740 | 8/1989 | Muramatsu | 341/23 |
| 4,871,992 | 10/1989 | Petersen | 340/407.1 |
| 4,897,651 | 1/1990 | DeMonte | 341/22 |
| 5,034,602 | 7/1991 | Garcia | 341/31 |
| 5,036,440 | 7/1991 | Takii | 362/293 |
| 5,063,377 | 11/1991 | Smith | 345/110 |
| 5,086,287 | 2/1992 | Nutzel | 340/407.1 |
| 5,091,865 | 2/1992 | Yamada et al. | 340/407 |
| 5,222,895 | 6/1993 | Fricke | 434/114 |
| 5,329,078 | 7/1994 | Gustafson | 340/407.2 |
| 5,341,133 | 8/1994 | Savoy et al. | 345/158 |
| 5,349,379 | 9/1994 | Eichenlaub | 348/59 |
| 5,479,185 | 12/1995 | Biverot | 345/87 |

OTHER PUBLICATIONS

Yutaka et al, Validity of a 3-D tactile display for the blind. IEIC Tech. Report, Jun. 1994, vol. 94, No. 277.
Hulme, Japanese help themselves by helping others. Machine Design vol. 65, No. 15, Jul. 23, 1993.
David Hulme, Japanese Help Themselves By Helping Others, Jul. 23, 1993, pp. 28/29, Machine Design magazine.

Primary Examiner—Raymond J. Bayerl
Assistant Examiner—John Suraci

[57] ABSTRACT

A human/machine interface system that presents information in a three-dimensional and visual form and is optionally capable of receiving input.

The Three-Dimensional Display comprises a display shape with visual displays that is movable to provide visual and three-dimensional representative imagery. An optional method for sensing input can be added to allow user interaction with the display.

A number of these displays could be arrayed together and driven by appropriate circuitry to present to the user visual and physical representation upon which the user can act to communicate back to the machine.

36 Claims, 10 Drawing Sheets

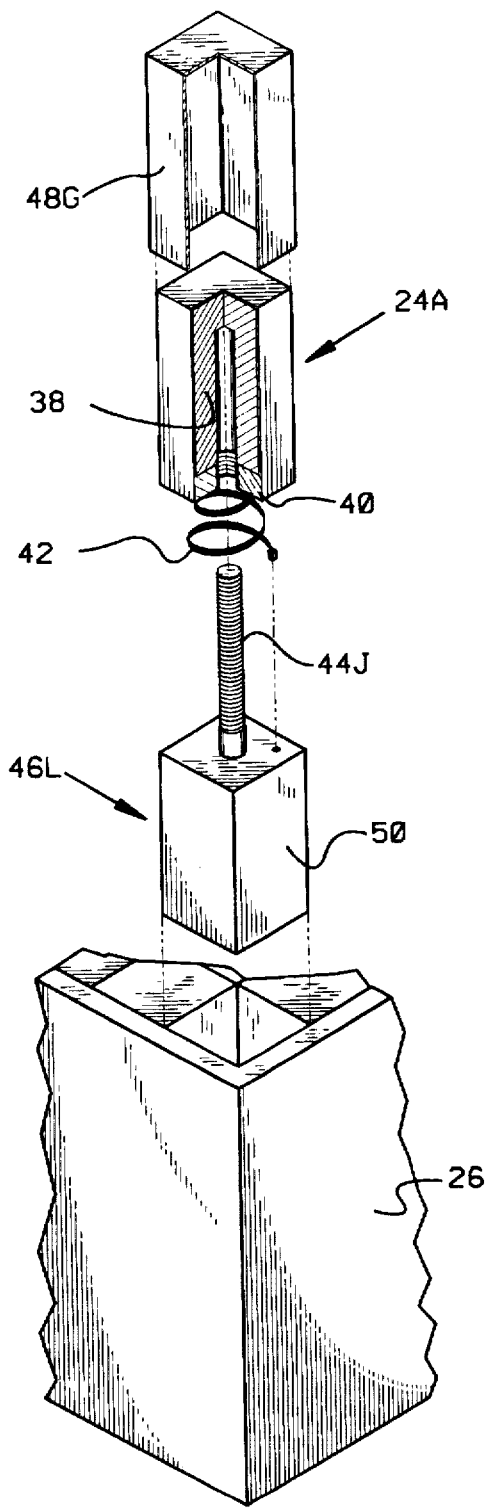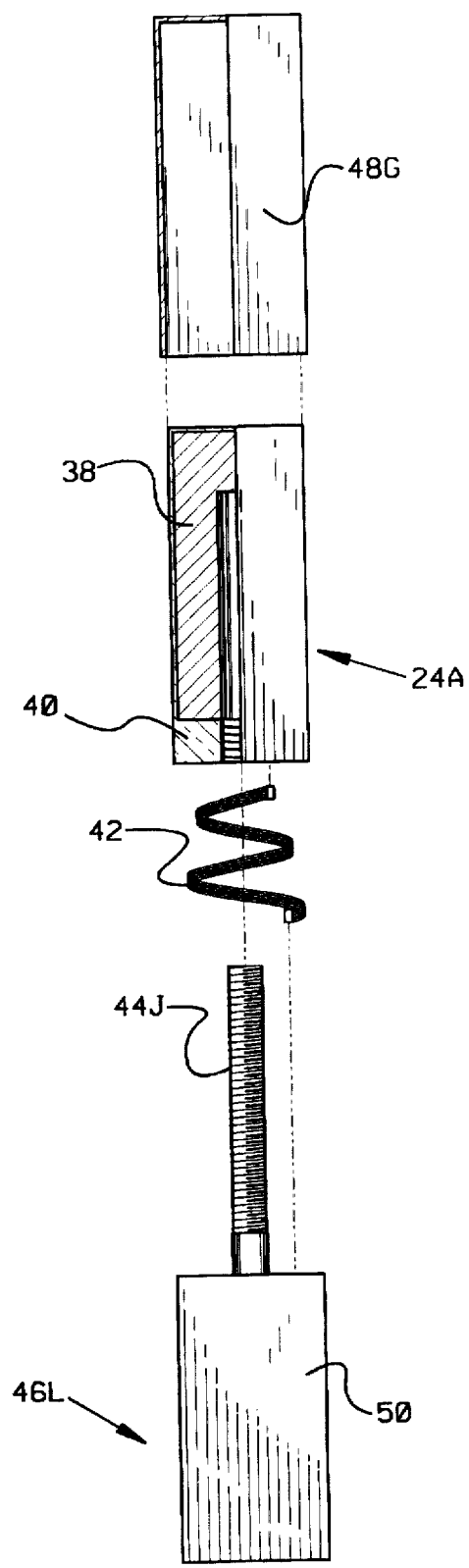
FIG. 8
FIG. 9

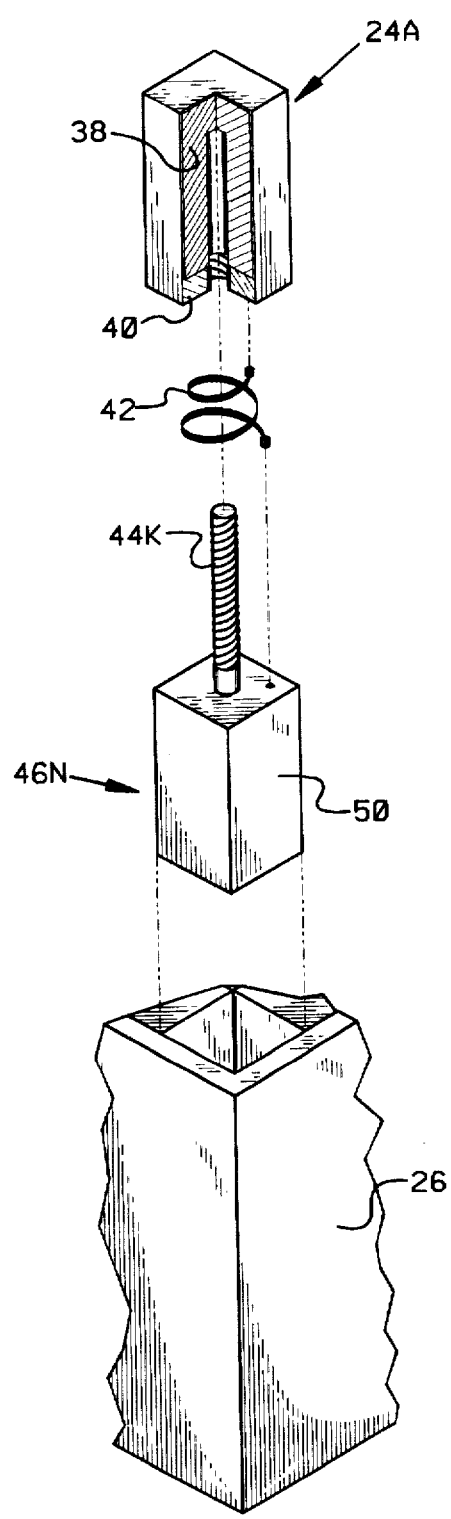
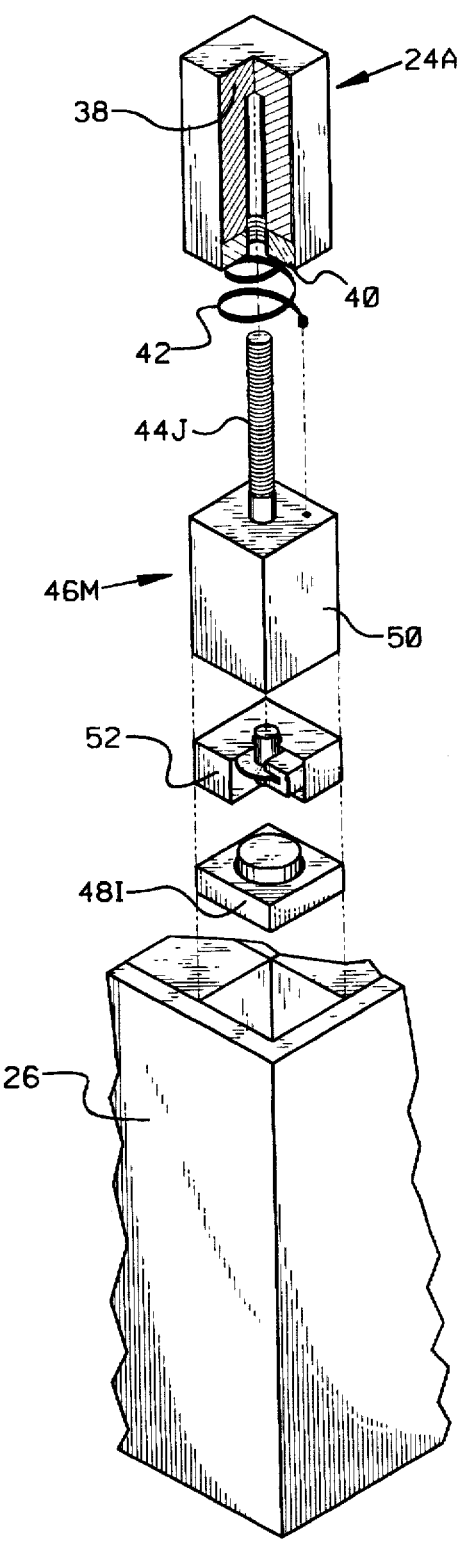
FIG. 10
FIG. 11

THREE-DIMENSIONAL DISPLAY

FIELD OF THE INVENTION

This invention relates to human/machine display and control systems, specifically to an improved system that can represent objects and information in a visual and three-dimensional form and can also have data entry and command capabilities.

BACKGROUND OF THE INVENTION

There has been a long evolution of methods and systems used to both present information and control machinery. This evolution began with control knobs and levers on simple mechanisms. Further development led to systems of analog displays and indicators to display information with various types of switches and push-buttons for data entry and control. These systems were limited in that each display device could only represent a limited amount of information regarding one part of an operation. The control devices were restricted to controlling one specific function or process at a given time. The main disadvantage was the need to provide an indicator for each operation and a control for each function.

Further development yielded more advanced display systems such as the Cathode Ray Tube (CRT). Although these displays could be used to show a wide range of information, they are somewhat unwieldy and occupy a large amount of space in relation to their useful display area. Furthermore, they could only represent information in two-dimensional form, while that same information would be much more easily comprehended if represented in the three-dimensionality of the real world. Later, flat screen displays such as Liquid Crystal (LCD), Electroluminescent (EL), Vacuum Fluorescent, and Gas Plasma Displays were devised to improve on certain aspects of CRT's, such as the required amount of space for a given display area. The two-dimensional limitation, however, still remained.

Parallel with the development of display technology were advances in control and data entry systems. The first of these was the control switch array keyboard. The venerable keyboard does allow tactile response in use but earlier versions could only receive input in relation to fixed control indicia. The keys are limited in that their size and shape characteristics are fixed. In simple terms this is an array of discrete push-buttons for entering preordained commands or data. Some later developments improved this technology with the introduction of variable indicia so that commands for a particular push-button can be altered to a limited extent. This did not, however, eliminate the limitations of fixed size, shape and elevation on what was still an array of fixed-dimension push-button switches.

The advent of light pen technology began to merge displays and controls, allowing the user at least direct association with the information presented on the display. However, no tactile feedback was present with the screen interactions and the necessity of the extra device (the light pen itself) can be an inconvenience.

An improved merging of display and control technologies was the touch screen in a number of different versions. These types of devices were first used on CRT's and then on flat screen displays. As with the light pen, the user had a direct association with the information on the screen but again did not receive tactile responses in using the display. The three-dimensional world was still limited to two-dimensional representation. The user still had no tactile perception in operating a flat screen and was forced to rely on auxiliary audio signals to acknowledge data entry.

Another control technology that was developed is commonly known as the 'mouse'. While these devices offer tactile feedback to the user, they only provide visually represented association with the information on the display screen, and again they are extra accessories. Another recent development is voice input or control which, because of privacy and environmental noise considerations, has limited usefulness. Pen input technology also has certain advantages but its capabilities are limited to entering written data, and its disadvantages are identical to those of the light pen.

The general trend in technology is to encompass more features with smaller packages, thereby expanding the capabilities of a system. This results in diminished space for display and control systems while, conversely, greater quantities of information must be presented and more functions must be controlled. These two competing factors will result in the necessary step of combining display and control functions in the most compact manner possible. Their capabilities will have to be enhanced to meet future technological needs in such a way that information and control functions can be represented and used easily, while taking up a limited amount of space. Feedback from the system to the user will be desirable, while extra accessories will become nuisances.

There is also the related technological area of the tactile display devices that are primarily used by visually impaired persons. These typically consist of a system of solid pins that are actuated by various methods. These devices can only provide tactile imagery of a limited nature, and lack the capability of displaying visual information.

OBJECTS AND ADVANTAGES

Accordingly, several objects and advantages of the Three-Dimensional Display are as follows:

(a) To provide a device capable of representatively displaying objects both visually and three-dimensionally.

(b) To provide a device with the capability of using symbolic three-dimensional icons or constructs to represent command functions and information.

(c) To provide a device which allows for complete software control of both the appearance and tactility of the device to allow it be completely adapted to particular applications and users.

(d) To provide a device that has both visual and tactile imaging ability so that it can be used by both sighted, and visually impaired users.

(e) To provide a device allowing increasingly more complex technologies to be easier to use and understand.

(f) To provide an information entry system with tactile feedback capability.

(g) To provide a device that combines information display and control functions in one unit.

(h) To provide an interface device that would eliminate the need for external control devices; e.g. light pens.

Further objects and advantages of the invention will become apparent from consideration of the drawings and ensuing descriptions.

SUMMARY OF THE INVENTION

In light of the present limitations and difficulties in the prior art, the present invention combines the flexibility of flat panel display technology and information input with separately movable display shapes 24 to produce, for the first time, the ability to represent three-dimensional objects both in physical and visual form, while also allowing interactions with these representations in applications where this is desirable. This then enables the control of and interaction with a myriad of machines with but a simple modification in control software.

The invention comprises a display shape 24; which further comprises visual display means 38 and supporting means 40 to hold the visual display means 38 in a three-dimensional configuration; actuating means 46 to physically move the display shape 24, and in some applications an input sensing means 48. A plurality of these Three-Dimensional Displays 28 could be arranged in an array.

Possible support circuitry (described here as it relates to an array of Three-Dimensional Displays 28) could comprise a central processor 30 that would send signals to visual display driver circuits 32 and actuator driver circuits 34. The display driver circuits 32 would cause the visual display means 38 to project visual information from the top and, in some cases, sides of the display shapes 24. The display shapes 24 would be moved .substantially parallel to each other by the display actuating means 46 through the actuator driver circuits 34 to approximate a three-dimensional form. A three-dimensional construct of the pattern of display shapes 24 moved into specific positions in conjunction with the data presented by the visual display means 38 would form three-dimensional imagery.

To further enhance the capabilities of the invention, an input sensing means 48 associated with each Three-Dimensional Display 28 would be utilized to sense user contact with a Three-Dimensional Display 28. This could indicate input to the Three-Dimensional Display 28 or obstructions to the movement of the display shape 24. The signals from the input sensing means 48 would be interpreted by input interface circuits 36. The indications would then go back to the central processor 30 and be acted upon to produce more displays or other operations. Thus a two-way communications link between operator and machine would be facilitated. The system could also have additional I/O circuits to communicate with other external devices. Note that components of the invention will have a 'generic' part number with letters A,B,C... denoting various possible choices or designs of a component.

BRIEF DESCRIPTION OF THE DRAWINGS

FIG. 8 is an exploded pictorial view of the Three-Dimensional Display 28 showing the basic components of the preferred embodiment with the optional input sensing means 48G. The display shape 24A and input sensing means 48G are both shown in half-sectional view.

FIG. 9 is an exploded side view of the Three-Dimensional Display 28 showing the basic components of the preferred embodiment with the optional input sensing means 48G. The display shape 24A and input sensing means 48G are both shown in half-sectional view.

FIG. 10 is an exploded pictorial view of the Three-Dimensional Display 28 utilizing an actuating means 46N with a motor 50 and a lead screw 44K with sufficiently high pitch angle as to be non-locking, thus allowing induced voltage to serve as input sensory means. The display shape 24A is shown in half-sectional view.

FIG. 11 is an exploded pictorial view of a Three-Dimensional Display 28 where a positional encoder 52 is incorporated in combination with a lead screw actuator motor 46M and the optional input sensing means 48I is a mechanical switch. The display shape 24A and positional encoder 52 are both shown in half-sectional view.

DETAILED DESCRIPTION OF INVENTION

Figure 1:
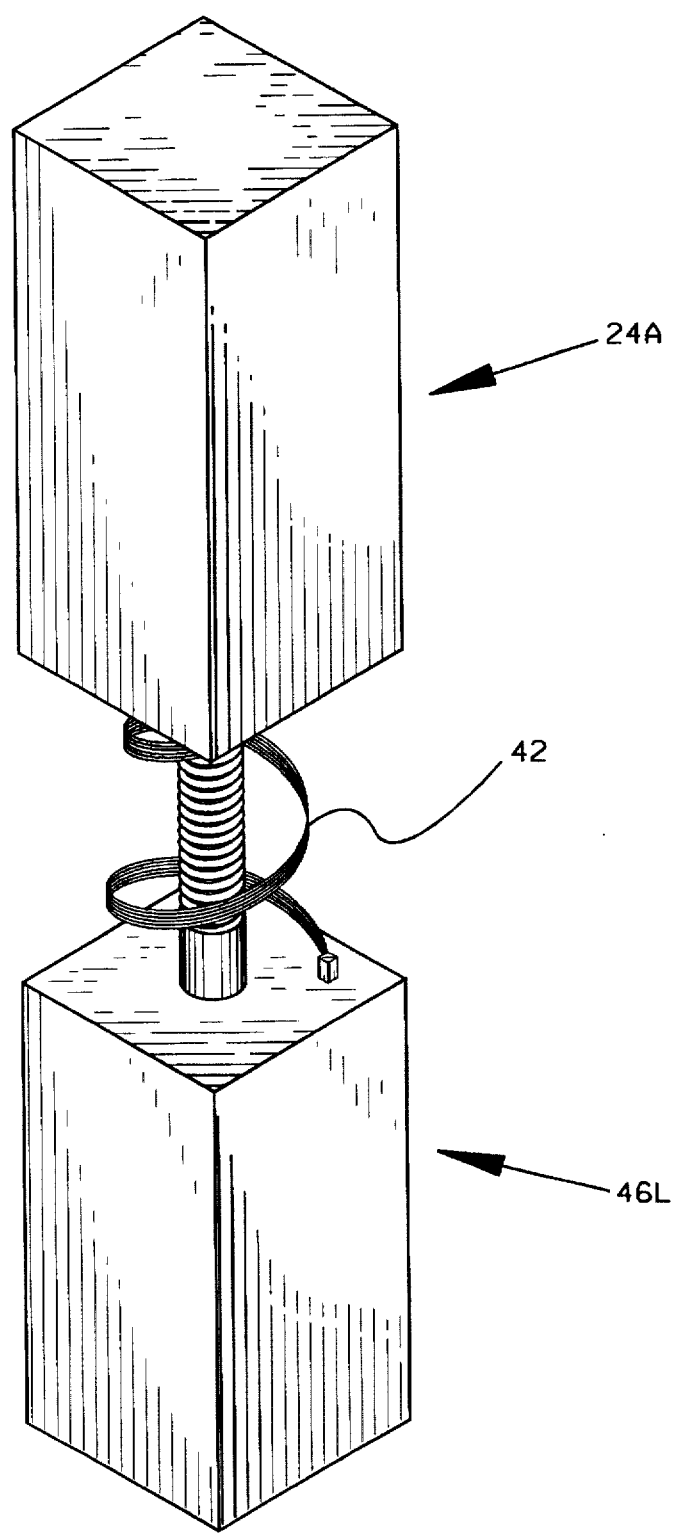
FIG. 1 is a pictorial representation of the Three-Dimensional Display 28.
Figure 2:
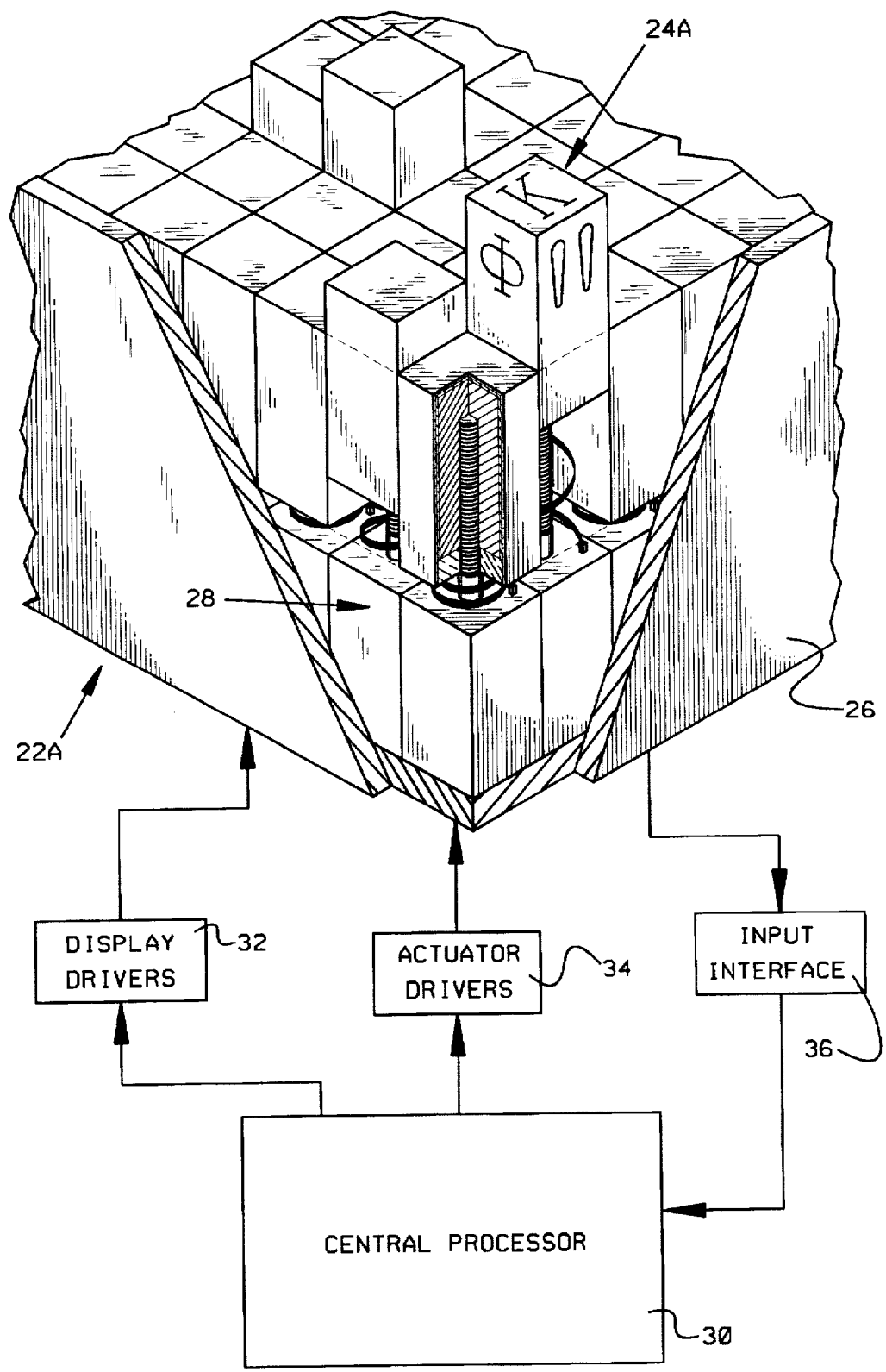
FIG. 2 is a sectioned pictorial view of a portion of a display array 22A of Three-Dimensional Displays 28 with a block diagram of possible appropriate circuitry to control the display array 22A. One display shape 24A is shown in a half-sectional view for clarity, and the display enclosure 26 is shown in a cutaway view. Note that the positions of said display shapes 24A are depicted in a purely random configuration.

The present invention incorporates several major technologies, including a display means, an actuating means, and an optional input sensing means. Each of these technologies has several means available for accomplishing its function or task. It therefore follows that each of the components of the device can be selected from a number of choices with substantially identical results. In some cases a particular method may be chosen over another for various reasons. However, it must be understood that for each of the major components of the device there are choices that can be made independently without having any effect on other parts of the invention. There are also a variety of designs that can be incorporated into the device such as the form of the display shape 24. It should also be made clear that the number of options has a multiplying effect on the number of unique combinations of major components and thus the number of embodiments possible for the invention. Some exemplary variations will be discussed after the description of the preferred embodiment.

The preferred embodiment of the invention is illustrated in FIGS. 1, 2 3, 8, and 9. The Three-Dimensional Display 28 comprises a display shape 24, which further comprises visual display means 38 and supporting means 40; an actuating means 46; and an optional input sensing means 48. Each Three-Dimensional Display 28 has a lower portion that can be mounted to a display enclosure 26 or other suitable base and an upper portion that is free to move independently. In the preferred embodiment, the fixed portion is the actuating means 46L; while the display shape 24A, including the visual display means 38 and supporting means 40, and the optional input sensing means 48G all move as one unit. As with other aspects of this invention, there are a number of factors and tradeoffs associated with the dimensionality of the Three-Dimensional Display 28. Exemplary would be items such as application, cost and imagery resolution required of the display.

An array of Three-Dimensional Displays 28 in its preferred embodiment would consist of a display enclosure 26 or other suitable base, and a plurality of Three-Dimensional Displays 28, each with a four-sided display shape 24A. Said enclosure 26 provides at least a stable platform for said Three-Dimensional Displays 28 and optionally a means of maintaining them in substantially parallel positions with regard to each other by counteracting any torque that may occur during the actuation or information inputting stages if necessary. The enclosure 26 may also be designed to perform other functions; such as containing the control, drive, and switch interface circuitry; supporting power supplies; supporting means for sealing out environmental contamination; or housing I/O circuits.

The actual size and makeup of the Three-Dimensional Display 28 will vary according to the application for which it is utilized and the technology employed for each of the components. For an array of Three-Dimensional Displays 28 targeting a number of people at a distance (for example advertising), each of said Three-Dimensional Displays 28 could be relatively large since resolution would be less critical and user interaction may be minimal or nonexistent. For this type of application, the input sensing means 48 may be unnecessary. Conversely, for presenting information to and interacting with one or two persons, higher resolution would be desirable, and therefore the Three-Dimensional Displays 28 would be preferably small with possibly larger travel distances to more accurately represent objects three-dimensionally. Here, the input sensing means 48 would be added to allow user interaction with the device. Generally, smaller Three-Dimensional Displays 28 will produce a display array 22 with better resolution and will require less powerful actuators; however, the system will be more complex. Display arrays 22 with larger Three-Dimensional Displays 28 will have poorer resolution and require more powerful actuators, but will be simpler.

The display shape 24 provides the formation of the three-dimensional imagery of the invention based on its actuated location in relation to adjacent display shapes 24. To allow ease of motion, said display shape 24 must have a constant profile along the axis of motion parallel to that of the adjacent display shapes 24. The external surface of the display shape 24 could utilize low-friction transparent or translucent materials or abrasion-resistant coatings to reduce friction in actuation of the display shape 24.

Figure 3:
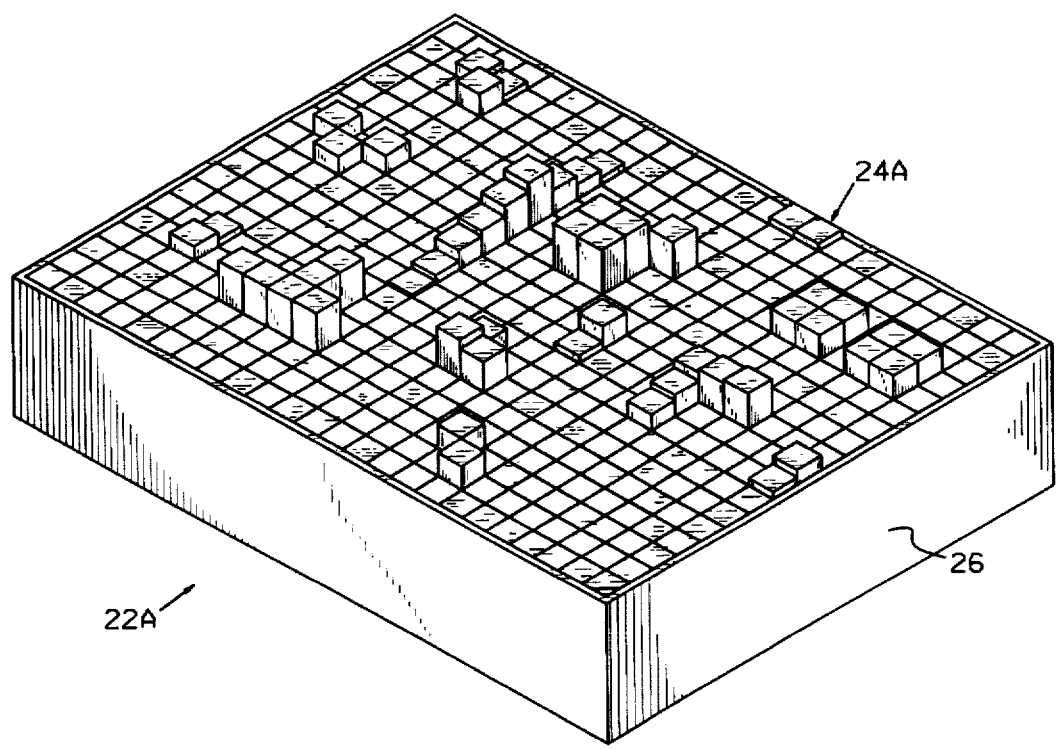
FIG. 3 is a pictorial representation of a display array 22A with an arbitrary number of Three-Dimensional Displays 28, each of which has a four-sided display shape 24A. Note that the positions of said display shapes 24A are depicted in a purely random configuration.
Figure 4:
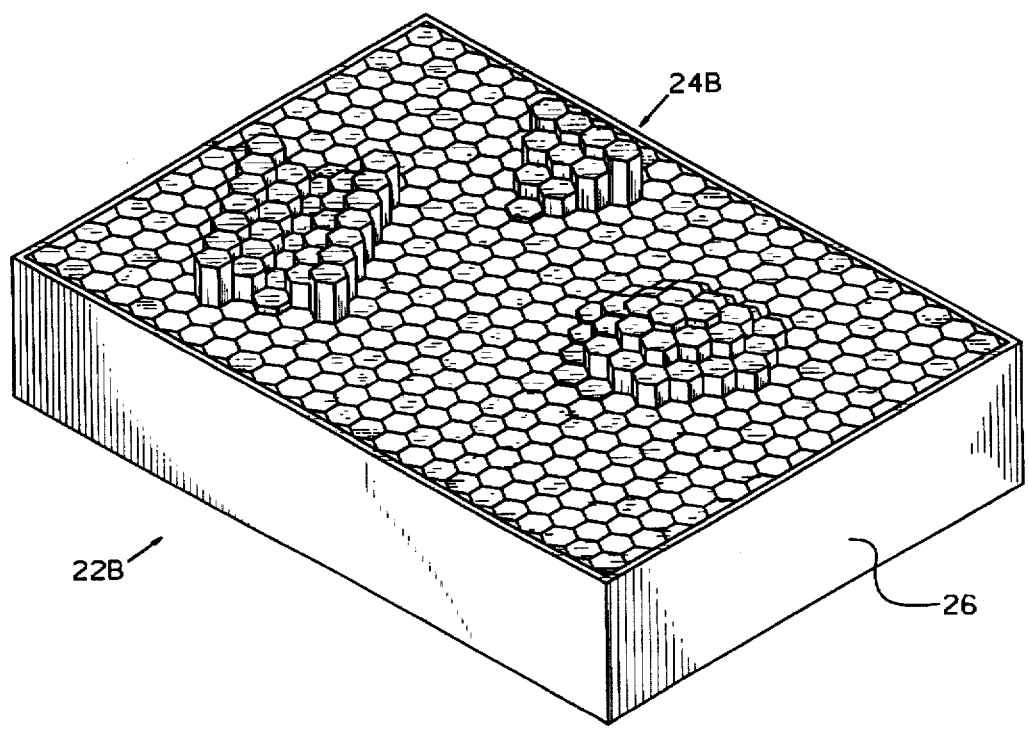
FIG. 4 is a pictorial representation of a display array 22B with an arbitrary number of Three-Dimensional Displays 28, each of which has a six-sided display shape 24B. Note that the positions of said display shapes 24B are depicted in a purely random configuration.
Figure 5:
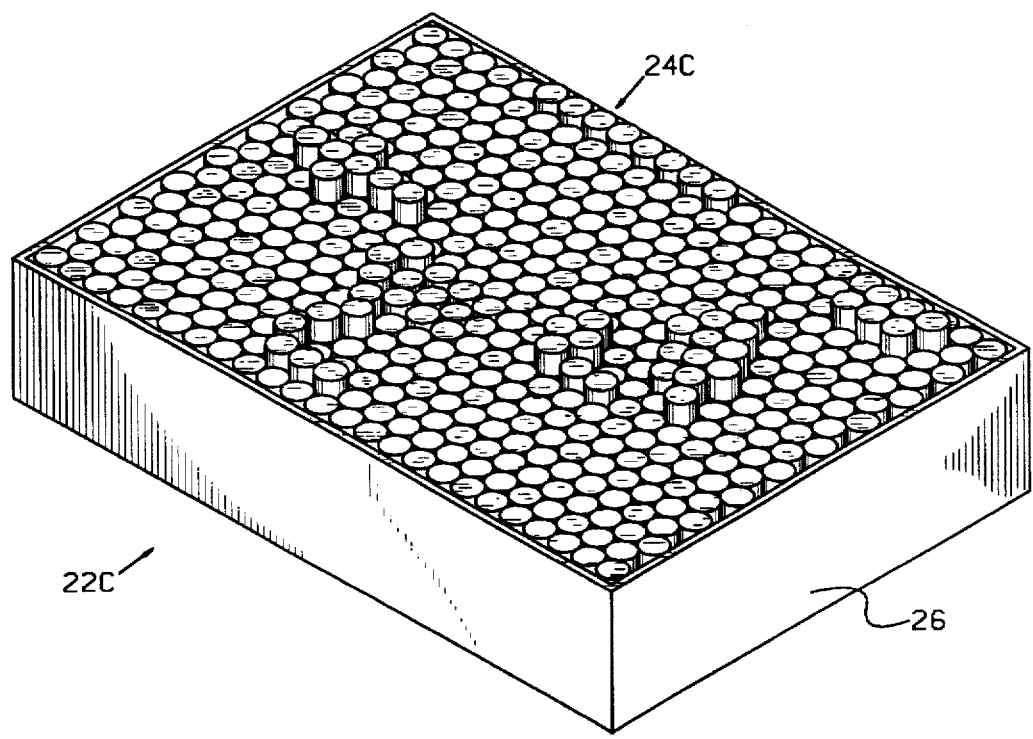
FIG. 5 is a pictorial representation of a display array 22C with an arbitrary number of Three-Dimensional Displays 28, each of which utilizes a circular display shape 24C with a multi-sided lower portion. Note that the positions of said display shapes 24C are depicted in a purely random configuration.
Figure 6:
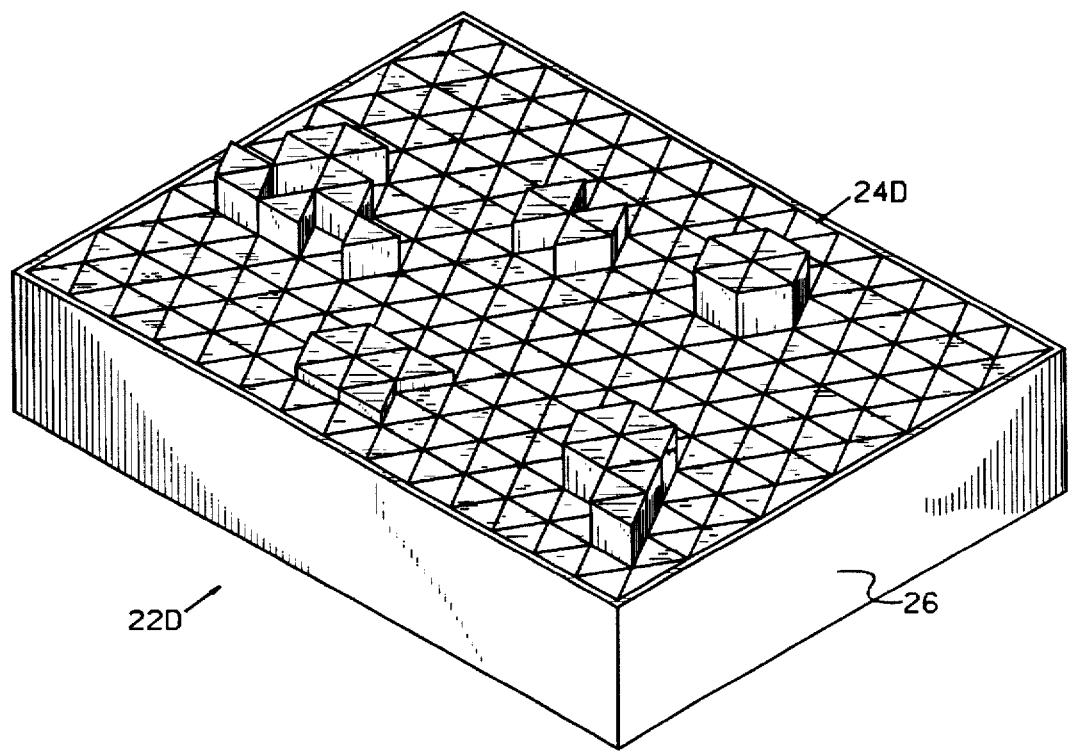
FIG. 6 is a pictorial representation of a display array 22D with an arbitrary number of Three-Dimensional Displays 28, each of which has a three-sided display shape 24D. Note that the positions of said display shapes 24D are depicted in a purely random configuration.
Figure 7:
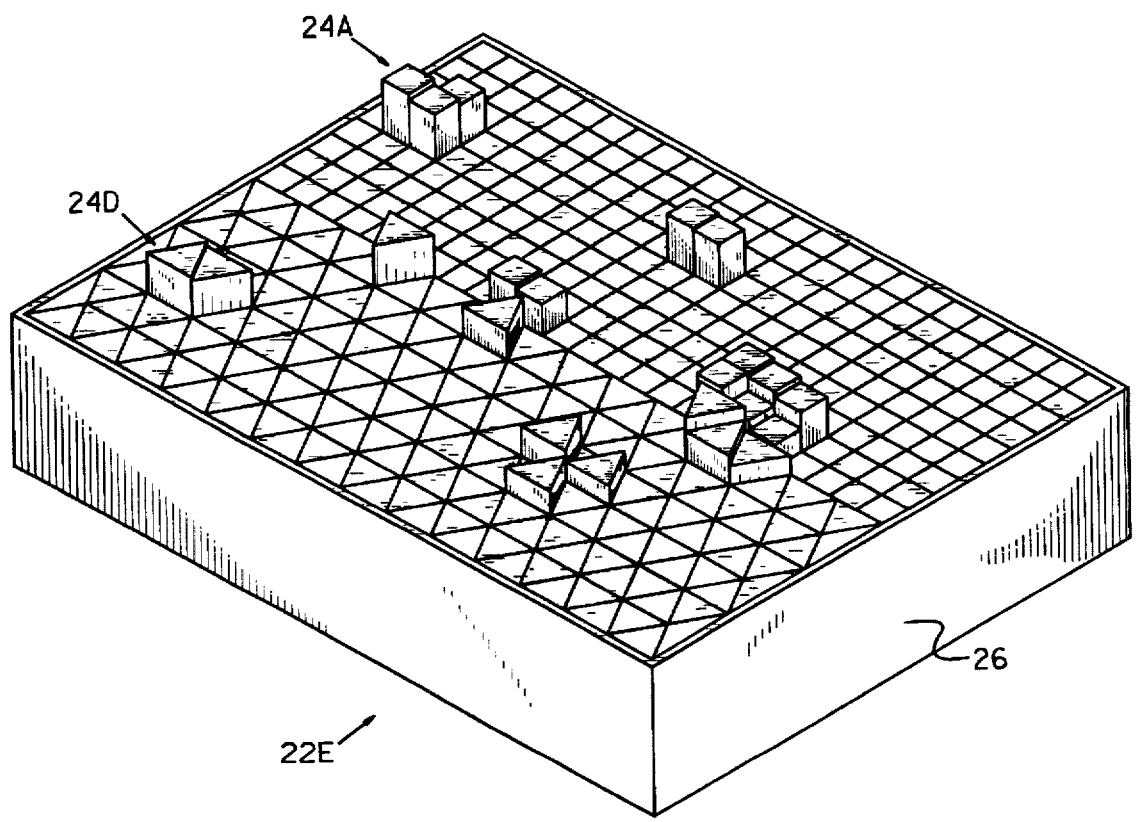
FIG. 7 is a pictorial representation of a display array 22E with an arbitrary number of Three-Dimensional Displays 28 that is an example of an array combining a plurality of display shape 24 designs (here the example incorporates both three-sided display shapes 24D and four-sided display shapes 24A). Note that the positions of said display shapes 24 are depicted in a purely random configuration.
Figures 12, 13, 14:
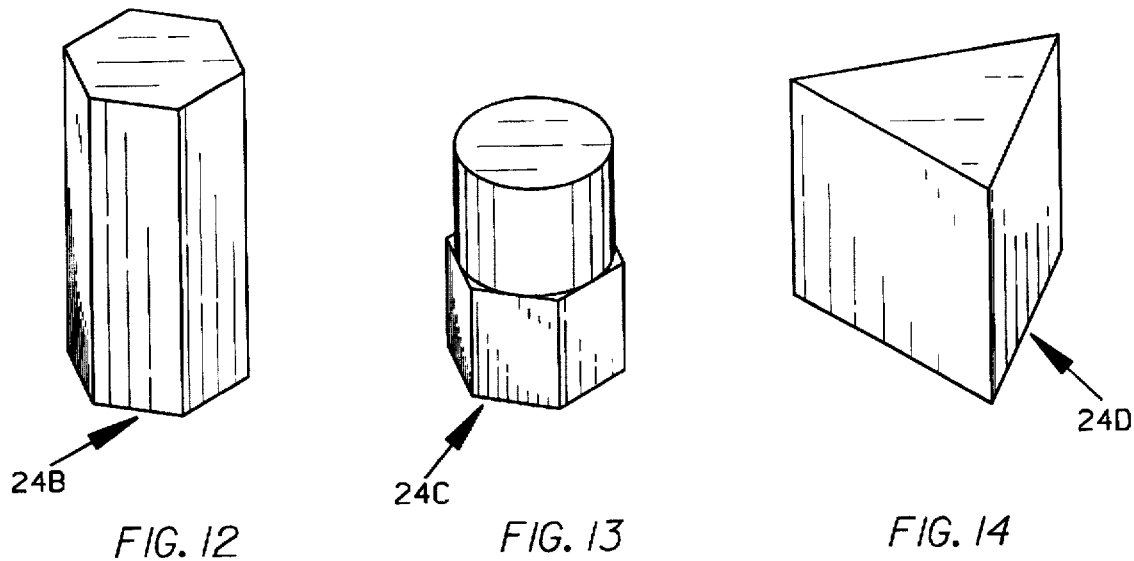
FIG. 12 is a pictorial view of a six-sided display shape 24B.
FIG. 13 is a pictorial view of a circular display shape 24C with a multi-sided lower portion.
FIG. 14 is a pictorial view of a three-sided display shape 24D.

The preferred embodiment for the display shape 24 is a four-sided shape, simply because an array of a plurality of substantially identical four-sided display shapes 24A fits easily into a typical four-sided enclosure, such as that exemplified in FIG. 3. However, alternate multi-sided shapes could be employed. Exemplary alternative display shapes 24 include circular. (FIG. 5), three-sided (FIG. 6), and six-sided (FIG. 4). Combinations of several display shapes could also be utilized in one enclosure, as in FIG. 7. The display shape 24, as mentioned, further comprises the visual display means 38 and the supporting means 40.

The visual display means 38 will function to convey the two-dimensional visual information presented by the system to the user. To accomplish this task, said visual display means 38 must be able to be configured to fit within the confines of the aforementioned display shape 24, which will vary according to the application. The display must also be controllable via the system software display driver circuits 32 and central processor 30. At the present time, there are a number of technologies that could be chosen for the visual display means 38. Some well-suited and exemplary choices are: Liquid Crystal Displays (LCD), Light-Emitting Diodes (LED), Electroluminescent (EL) Displays, Vacuum Fluorescent Displays, and Gas Plasma Displays. The type selected will depend entirely upon the configuration of a particular system and the task it is designed to accomplish.

The supporting means 40 will simply be a structure designed to hold the visual display means 38 in a three-dimensional configuration. The actuating means 46 can act upon or engage with the supporting means 40 to move the display shape 24 as a unit into various positions.

The three-dimensional imagery presented by the invention, while formed by the location of the display shape 24 with respect to adjacent shapes, will be governed by the actuating means 46. Said actuating means 46 will function to convert, in a controlled manner, one form of energy into mechanical energy in the form of substantially linear motion, thereby causing the display shape 24 to move in a substantially linear manner. This will provide not only the three-dimensional visual information, but also physical three-dimensional representation that can serve as tactile feedback to a user. Here, again, there are a number of technologies that could be employed.

The preferred embodiment for the actuating means is a lead screw actuator motor 46L as illustrated in FIGS. 8 and 9. Here, the actuating means 46L consists of a rotary stepper motor 50, which allows for open loop position control, with an integral externally threaded lead screw shaft 44J. In the preferred embodiment the supporting means 40 in the display shape 24A would contain a section with internal threads that substantially match the external threads of said lead screw shaft 44J, as well as a clearance area that may also extend further into the display shape 24A to allow space for the lead screw shaft 44J when the display shape is at its lower limit of travel. The stepper motor 50 would be securely mounted to the base of an enclosure 26 or other suitable base such that the motor itself cannot rotate, and here the display shape 24A is four-sided with each side abutting one side of another four-sided display shape 24A when used in an array to counteract torque. The threads inside the supporting means 40 would be engaged with those on the lead screw shaft 44I in such a way that rotation of the lead screw will cause the display shape 24A to move axially along said lead screw shaft 44J, in one direction or the other depending upon the direction of rotation of said lead screw shaft 44J, while the adjacent display shapes 24A or the optional support grid 88 absorbs the rotational torque. In this embodiment, the lead screw threads are designed to be self-locking to operate properly with the optional input sensing means 48G. Other configurations may favor a non-locking screw thread.

The optional input sensing means 48 will detect the various types of physical contact made with the invention by the user. It could also potentially determine the position of the contact, the direction of the pressure, or even the medium contacting it (i.e. pen point or fingertip), depending on the type of sensor and the control software. Again, there are a wide variety of choices for the input sensing means, as well as several locations for it, depending upon the configuration of the embodiment.

The optional input sensing means 48 in the preferred embodiment is a capacitance touch switch input sensor 48G. This touch switch, which would have to be constructed of a transparent or translucent material, would be mounted on the outer surface of the display shape 24, and consists of touch pads that utilize a capacitance effect to sense physical contact. When a pad is touched, the capacitance of that layer changes. This change is detected by the input interface circuits 36 and interpreted and acted upon by the central processor 30 and the system software for the application in use. These touch pads could be positioned on the top surface of the display shape 24, or on the top and the sides of the display shape 24. In applications where input touch pads are also on the side surfaces of the display shape 24, these side surfaces would join the top surface as the input sensing means 48. In this situation, the input sensing means 48 could also be used to detect the proximity of neighboring Three-Dimensional Displays 28 when used in an array by sensing the adjacent touch pads. The control software could then be made to determine the positions of the various elements in the array relative to each other. This would allow the system to initialize all elements to a particular position at desired moments during the operation of the invention, thus allowing for better open loop control of the actuation of the display shapes 24.

Also included in the Three-Dimensional Display 28 is a means to conduct signals between the stationary portion and the moving portion. As was mentioned, the preferred embodiment for the Three-Dimensional Display 28 incorporates both a lower portion, which is the actuating means 46L, mounted to a display enclosure 26 or other suitable base; and an upper portion including the four-sided display shape 24A, which further comprises the visual display means 38 and the supporting means 40, and in some cases an input sensing means 48G. This upper portion moves as a unit relative to the fixed lower portion. Any device that is capable of conducting signals between the two portions as they traverse through their limited sliding movement is suitable for this task. Exemplary methods include: some forms of sliding contacts, flexible connectors, and opto-electric connectors.

In the preferred embodiment, as shown in FIG. 8, a turbinated or spiral shaped signal conductor 42 is utilized. This conductor is composed of a plurality of flexible metallic ribbons enclosed within an insulating material. The conductor would flex along the axis of movement of the four-sided display shape 24A in a manner similar to that of a spring. With the spiral shaped signal conductor 42 in an extended state, as it is when the display shape 24A is at its upper limit of travel, it would resemble a cone shape. With the display shape 24A at its lower limit of travel, said spiral shaped signal conductor 42 would be in a closed state where it would resemble a spiral when viewed from above. The ability of the coils to nest within each other would allow the spiral shaped signal conductor 42 to take up a minimal amount of space while in the closed state.

The component of the invention that unites and organizes everything is the control system. One possible control system would drive the visual display means 38 to produce the desired two-dimensional visual information; drive the actuating means 46 to move the display shape 24 into its proper position to present the three-dimensional information; and also detect and interpret the signals from the optional input sensing means 48 to gather the user input. It may also be required to perform other tasks, such as communicating with external devices through input/output circuitry. Overall control of the system will be accomplished through a central processor 30, which will control all of the various drivers based on the software for the application being run. The control system for a display array 22 of Three-Dimensional Displays 28 would perform essentially the same functions, but would be a more complex system.

The central processor 30 will interface with at least two sets of circuits (three if the optional input interface circuits 36 are needed for the input sensing means 48): the display driver circuits 32; and the actuator driver circuits 34. The central processor 30 will send signals out to the display driver circuits 32, which will produce the desired two-dimensional visual imagery on the visual display means 38. The type of circuitry will be determined by the type of display technology utilized for a particular application, while the complexity of the system will be determined by both the size of the individual visual display means 38 and the quantity of Three-Dimensional Displays 28. The central processor 30 will also send signals out to the actuator driver circuits 34, which will drive the actuating means 46 to move the display shapes 24 accordingly to create the desired three-dimensional imagery. Similarly, this circuitry will be dependent on the type of actuating means 46 chosen for an application. It will also depend on whether the actuating means 46 are of the open loop or closed loop variety. When they are present, the central processor 30 will receive signals from the input interface circuits 36, which will relay user input in the form of the location of the input sensors activated, and possibly the type of activation or other information. This information would then be interpreted by the processor based on the software for the application, and then acted upon by sending more signals to the various circuitry to achieve the desired response.

The actuator driver circuits 34 and the optional input interface circuits 36 may in some cases interact, such as when the movement of a display shape 24 is blocked. In some configurations the input sensing means 48 could detect this and the input interface circuits 36 would then report back to the central processor 30 or the actuator driver circuits 34 so that appropriate action may be taken to remedy the situation. In some cases, with appropriate sensing means, the input interface circuits 36 may report directly to the actuator driver circuits 34 regarding the positions of the various Three-Dimensional Displays 28.

As mentioned early in the description of the present invention, virtually all of the components of this device have several possible choices that will perform the same task. Several exemplary options for various means will now be described.

Some possibilities for the display shape 24 and the visual display means 38 were discussed earlier, as these options are relatively obvious extensions of the preferred embodiment. In fact, any available technology for visual displays could theoretically be employed here. There are really no specific restrictions, other than those that would result from a particular application.

The actuating means 46, however, has a vast number of possible choices, some of which may not be so obvious. Any device that outputs linear motion or causes a display shape 24 to move linearly could be considered for this application in the present invention. It should be noted, however, that any actuating means not possessing the ability to accurately control the distance of movement may have to be supplemented by some type of positional encoder 52, as is shown in FIG. 11. One example of an actuator not requiting this is the preferred embodiment of a rotary stepper motor 50 with an integral externally threaded lead screw shaft 44J.

Figures 15, 16, 17:
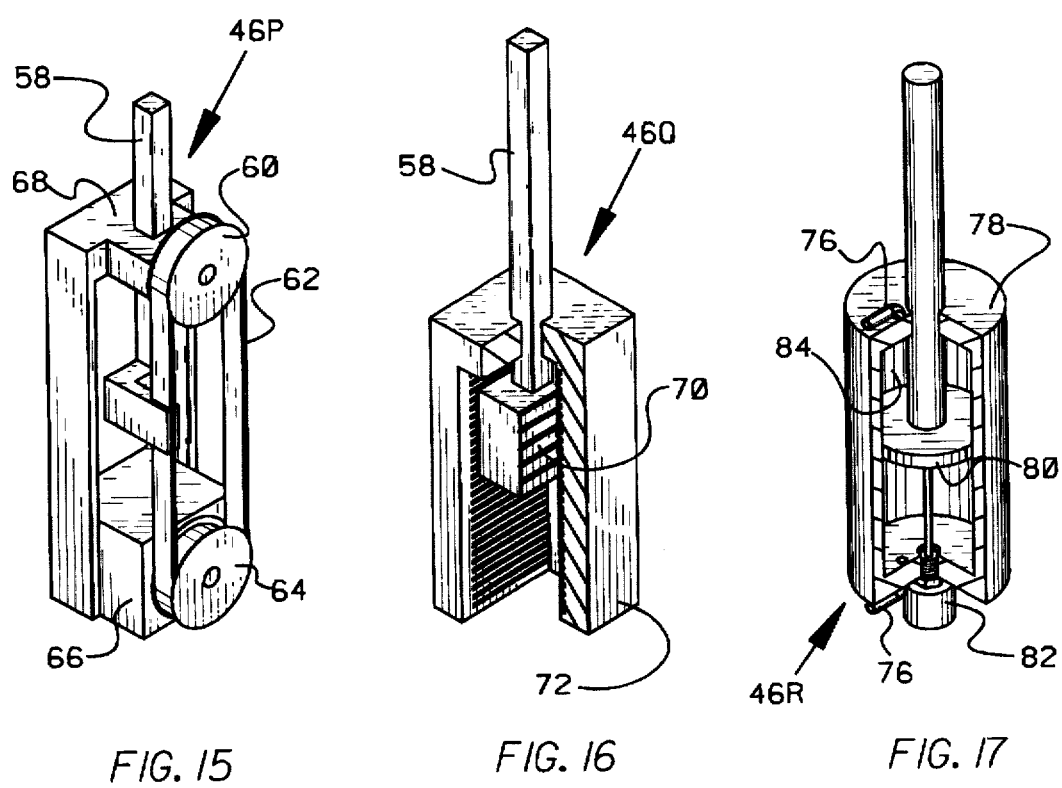
FIG. 15 is a pictorial view of a belt drive actuating means 46P.
FIG. 16 is a pictorial cutaway view of a linear motor actuating means 46Q.
FIG. 17 is a pictorial cutaway view of a pneumatically or hydraulically powered actuating means 46R with a piston position Sensor 82.

One possible choice for said actuating means 46 would be a linear motor or actuator, which is depicted in FIG. 16 as item 46Q. The linear motor actuating means 46Q would consist of two flat stator coils 72, in a 'U' shaped configuration. The linear motor armature 70 would be connected to a display actuator rod 58 that will extend through an opening in the top portion of the linear motor stator 72. The top end of the display actuator rod 58 is connected to the supporting means 40, thereby causing the display shape 24 to move with the linear motor armature 70.

Another technology that would produce linear motion is the basic hydraulic or pneumatic powered cylinder: FIG. 17 shows a pictorial cutaway view of a fluid power actuating means 46R. In this version of the invention, the actuator driver circuits 34 would control valves to admit actuation fluid 84 under pressure to the fluid power actuating means 46R. The actuation fluid 84 would be admitted through one of the fluid inlets 76 on the fluid power actuator cylinder 78 and vented from the other fluid inlet 76 depending on which direction the display shape 24 is to be moved. The pressure of the actuation fluid 84 on one side of the actuator piston and rod 80 would cause the actuator piston and rod 80 to move, thus moving the supporting means 40 attached to the end of said actuator piston and rod 80. For positional control, there would be a piston position sensor 82 that fits within an opening in the actuator piston and rod 80. Said piston position sensor 82 would register the location of the actuator piston and rod 80 and thus the display shape 24. This is an example of a reversible type actuator in that pressure placed on the display shape 24 resulting from user input could be detected as pressure in the actuation fluid 84. A signal resulting from this pressure could be communicated to the central processor 30 via the input interface circuits 36.

Devices that convert rotary motion to linear motion, similar to the preferred embodiment, could also be considered for this system. There are a great number of possible choices for this task, and a few of them will be discussed here. The basic driver in many of them could be either fluid or electric powered motors.

FIG. 15 shows a pictorial representation of a belt drive actuating means 46P. A fluid or electric powered rotary motor could drive this actuator; or any other such device that could provide the required torque. The belt drive motor 66, under command of the actuator driver circuits 34, would rotate the belt driver pulley 64. This in turn would cause the actuator belt 62 to also move. The upper portion of the actuator belt 62 would wrap around the belt drive idler pulley 60. The actuator rod 58 would be fastened to the actuator belt 62, thereby causing said actuator rod 58 to move with said actuator belt 62. The rotary motion from the belt drive motor 66 would therefore be transformed into linear movement along the straight section of the actuator belt 62. The display actuator rod 58 would thus move linearly in an opening in the belt drive actuator frame 68. The display shape 24 would be fastened to the top end of the actuator rod 58 via the supporting means 40, and would therefore move linearly along with said rod 58. The portion of the display actuator rod 58 that is attached to the actuator belt 62 will be limited to move only along the straight portion of the actuator belt 62.

This particular actuator could also be used to sense input from the user. Pressure on the display shape 24 from user input would be transmitted back thought the actuator to the belt drive motor 66. The resulting rotation of the belt drive motor 66 would cause either a voltage or fluid pressure indication signal resulting from the user input. This signal would be detected by the control system and acted upon as input. This would eliminate the requirement for a separate input sensor for a system using belt drive actuating means 46P, while still retaining the function, as the signal would act as the input sensing means 48.

Another example of an actuator that converts rotary motion to linear motion would be the lead screw actuating means 46L, 46N, or 46M, each of which is a combination of a rotary motor 50 (powered electrically, with fluid) or via some other motive force) coupled to a threaded shaft (44K or 44J, for example), as is depicted in FIG. 8, FIG. 9, FIG. 10, and FIG. 11. The shaft could be threaded either internally (i.e. a hollow shaft) or externally. In the case of an internally threaded shaft, a corresponding externally threaded mating rod would be attached to the supporting means 40. In the case of an externally threaded shaft, a corresponding internally threaded mating nut would be attached to or part of the supporting means 40 (for the purposes of further discussion the externally threaded shaft will be used). In either case, the display shape 24 itself is prevented in some manner from rotating. When said motor rotates said threaded shaft, the engaged threads in the mating part (supporting means 40) would then transfer this rotary motion into linear motion, causing the supporting means 40 and thus the display shape 24 to move axially along said threaded shaft.

This type of mechanism has several advantages. First, it utilizes mature technologies in both the powered rotary motors and the screw shaft and mating nut designs. Second, it has design versatility in that by varying the thread angle it can be used either as a self-locking actuator; or as an input registering device by virtue of regeneration effects. Third, it can be fit into a small amount of space and is a relatively simple design. It was for these reasons that the actuator for the preferred embodiment of the invention was chosen from this category.

There are a number of variations that can be made in the design of a lead screw type actuator, some of which will be discussed here. In addition to the choice of what means will be utilized to power the motor 50 (i.e. fluid, electricity, or another motive power), there is the selection of the particular type of motor within each field regarding the control and performance characteristics desired. There are design choices in the type of mechanical drive within the motor itself, as well as the thread pitch and form for the lead screw 44. With a rotary electric motor, the actuator lead screw 44 could either be directly attached to the armature of the motor or driven through a gear system that would produce more torque for a given size motor. Also, the threaded lead screw 44 could be either self-locking or non-locking, depending on the application.

The lead angle λ of the threads on the actuator lead screw 44 is an important factor in the design of the lead screw actuating means 46L or 46N. This angle determines if the threads will be self-locking or non-locking. Locking between the screw and the mating nut generally occurs when the coefficient of thread friction μ is greater than the tangent of the lead angle λ, as with actuator lead screw design 44J on actuating means 46L in FIG. 8 and FIG. 9. This is given in the following relation:

$$\mu > \tan \lambda$$

As the lead angle λ is reduced, there will be a corresponding reduction in the power required to move the display shape 24 a given distance. There will also be a reduction in the speed at which the display shape 24 will move. As the lead angle λ increases, the display shape 24 will move at a faster rate but will require more power to do so.

When the tangent of the lead angle λ is greater than the coefficient of thread friction μ, the threads will not be self-locking and the actuation of the display shape 24 will be reversible, as depicted by actuating means 46N in FIG. 10. With this actuator lead screw design 44K pressure on the display shape 24 will cause said lead screw 44K to rotate, which in turn causes the armature of the motor 50 to rotate and creates detectable regeneration voltage or fluid pressure. This is another example of how the actuating means 46 could also be used to sense input to the system in place of a separate input sensor, thereby eliminating the requirement for a physical input sensor from the invention, while still providing the function. Essentially, the regeneration voltage or fluid pressure would be the input sensing means 48.

There are also several thread forms that could be utilized in the lead screw actuating means 46L, 46N, or 46M depending on the application of the system. Possible thread choices include, among many others, the Unified, Whitworth, Acme, and square forms. The type of form chosen for a particular application would depend on a number of design considerations; including efficiency, strength or load carrying capability, ease of manufacture, size of the application, backlash desired, and a variety of other considerations.

Another type of actuator is the mechanical linkage actuator which is more suited to an array of Three-Dimensional Displays 28. In this type of system, the display shapes 24 could be moved by any of a variety of motion transmission devices such as cams, levers, shafts, belts, lead screws, or linkages; with a central mechanical drive. The possible arrangements for this are quite numerous; however, the basic outline involves one or a small number of main drive sources (i.e. motors) with some type of mechanical motion transmission device, coupled with some type of clutch device, positioned at each Three-Dimensional Display 28. The control system would determine which elements are to move, and would activate the appropriate clutch mechanisms for these elements. This would then cause energy in the form of mechanical motion from the main source to be transferred to the motion transmission devices located at these elements, in turn causing the elements to move. In this way, energy from the central source would be 'metered' out to the individual elements as needed.

Yet another possible category that could be utilized for the actuating means 46 includes the various technologies for converting electrical energy directly into mechanical motion. Exemplary of this would be piezoelectric or magnetostrictive technologies. The design of an actuator using this technology would be such that signals from the appropriate drive circuits would cause displacements in the actuator material and in turn move the display shape 24. The effects of these materials are also reversible; therefore, pressure on the display shape 24 and thus on the actuator can be detected as changes in voltage and current. This type of technology, then, is yet another example of an actuator with the capability of also sensing input to the system in place of a separate input sensor, thereby eliminating the requirement for a physical input sensor from the invention, while still retaining the function. Essentially, the voltage and current changes would function as the input sensing means 48. The advantages of the properties of these types of actuators would make this technology the best choice for the actuator in the present invention. However, they will probably require further development before they can be fully utilized.

Because these types of actuators develop a large force over a short stroke, in some cases a method may be needed to convert this to a longer stroke. One possible method would be a lever system that would produce the required range of motion. The actuating means 46 would apply force to the lever at a location near said lever's pivot point. The output would be taken from a point further from the pivot point. Simple mechanics dictates that the resulting output from the lever for a given input will be characterized by a larger displacement with a lower force when compared to said input.

In discussing the actuating means 46, it was evident that in some cases, said actuating means could also perform the function of the optional input sensing means 48, thereby eliminating one physical component. In addition to these situations and the previously described preferred embodiment of the capacitance touch switch, however, there are a number of other choices for the input sensing means 48. Any technology that is capable of detecting the touch of a fingertip, pen, or other input device, on a surface of a display shape 24 could be considered for this application in the present invention.

In addition to capacitance touch switches, there are also other touch switch technologies that could be utilized with the present invention. One of these would be a resistive touch input sensor. This type of switch would have the same form as the capacitance touch switch input sensing means 48G. This would consist of a series of switch layers on the top and sides of the display shape 24. Touching the outer layer creates a voltage drop that can be detected by the input interface circuits 36 as input contact. The touch type input sensor, regardless of type, would allow not only location but also directionality to be associated with the input. This type of data could be utilized to allow the user to touch the sides of a display for pointing input, similar to using a light pen, mouse, or track ball. The presence of a touch switch type input sensor on the sides of the display shape 24 would greatly increase the input selection area available on the Three-Dimensional Display 28.

Another type of input sensing means 48 is the category of switches that register input via direct pressure on or movement of the active elements contained in the switch. One possible method of using these types of switches would be placing them under the display actuating means 46. Input to a display would be registered from the substantially parallel movement of the assembly of the actuating means 46 and the display shape 24 relative to a fixed base or other surroundings; or to the other Three-Dimensional Displays 28 when in an array. This movement or pressure would result from the user applying input in the form of pressure to said Three-Dimensional Display 28. These types of switches have been combined into one general category of parts, as depicted by mechanical movement type input sensing means 48I in FIG. 11. Here, an exploded pictorial view is shown of an embodiment of the invention utilizing a mechanical movement type input sensing means 48I that would be attached to the actuating means 46 and, in this case, positional encoder 52. The switch itself would be situated on the bottom portion of the display enclosure 26, or other suitable base. In this particular application, the actuating means 46M would be self-locking, and therefore pressure exerted by the user on the Three-Dimensional Display 28 would be transferred through the assembly of the display shape 24, the actuating means 46, and the associated positional encoder 52, when present, to the input sensing means 48I.

There are also numerous types of circuit 'make and break' mechanisms that could be employed as input sensing means 48. One example includes hard contact type switches that utilize direct pressure between two contacts to activate the circuit. There are also Hall effect switches which could register input to a display shape 24. This would be accomplished via the motion of permanent magnets enclosed in the moving portion of the Three-Dimensional Display 28 relative to a stationary sensor containing a Hall effect generator, trigger, and amplifier. Alternately, the Hall effect generator, trigger, and amplifier could be contained in the moving portion of said Three-Dimensional Display 28, while the permanent magnets remain stationary. The relative movement between the magnets and the sensor changes the magnetic flux through the sensor, producing a voltage in the Hall generator and thereby activating the trigger to indicate input. Yet another type of 'make and break' switch would be reed switches, which either open or close a circuit when activated by permanent magnets moving into close proximity with them.

Another technology that could be utilized as the input sensing means 48 with the present invention is the saturable ferrite core switch. This type of switch utilizes a permanent magnet around a ferrite core. Saturation of the core inhibits a drive signal from being detected with a sense wire. Movement of the switch removes the magnetic field, allowing the core to act as a transformer. This would couple the signal to the sense wire and produce the switch activation signal in response to user input.

There are also types of switches, other than touch switches, that utilize capacitance in their operation. One of these types of switch designs incorporates two contacts; one of which acts as a drive circuit, and one of which acts as a sense circuit. The moving portion of the switch contains a plate which, upon moving, changes the capacitance in the circuit and couples the two elements to create a signal indicating input. There are also capacitive membrane type switches that are made up of three insulating materials. There is a stationary layer containing switch contacts, and an insulating layer that separates the stationary layer from a movable operational layer containing more switch contacts. As with other manual switches, pressure on the display shape 24 is transmitted through the actuating means 46 to the movable contact layer. This in turn is pushed through an opening in the insulating layer to contact the stationary layer and thus activate the switch.

A switch that uses mercury as its activation medium could also be utilized as an input sensing means 48 for the present invention. This type of switch would comprise a container with at least two contacts and a small amount of mercury. Input to the Three-Dimensional Display 28 would cause the container to flit, thereby causing the mercury to encompass both contacts, thus activating the switch.

To conduct the control signals between the moving portion of the Three-Dimensional Display 28 and the stationary portion of said Three-Dimensional Display 28, there are also methods other than that described in the preferred embodiment. Exemplary would be a series of elongated metallic strips to which an electrical connection is made via spring-biased contacts. The metallic strips would be orientated parallel to the axis of movement of the display shape 24 and would remain fixed in place. The spring-biased contacts would slide along the fixed contacts and would be attached to the display shape 24. The length of said fixed contacts would be equal to or greater than the distance travelled by said display shape 24. The number of pairs of fixed elongated contacts and spring-biased moving contacts would be determined by the type and quantity of visual display means 38 utilized in the display shape 24 and the type of input sensing means 48 utilized in the system.

In addition to the various choices put forth for the different components of the present invention, there are also several optional accessories that should be mentioned, as their presence will probably be desirable under some circumstances. Those that will be specifically mentioned here are enclosure options, such as sealing systems to prevent entry of foreign objects or material such as liquids, dirt, or dust; and a reticulated structure that could be used to support these sealing systems.

There may be applications where it would be advantageous to seal the system from dirt and moisture. Two exemplary means of accomplishing this would be a system of flexible covers over the display shapes 24 or a system of seals around the periphery of the display shapes 24. Both of these sealing methods could be independently used in the system. The preference of either method would be based on the individual situation.

Figure 18:
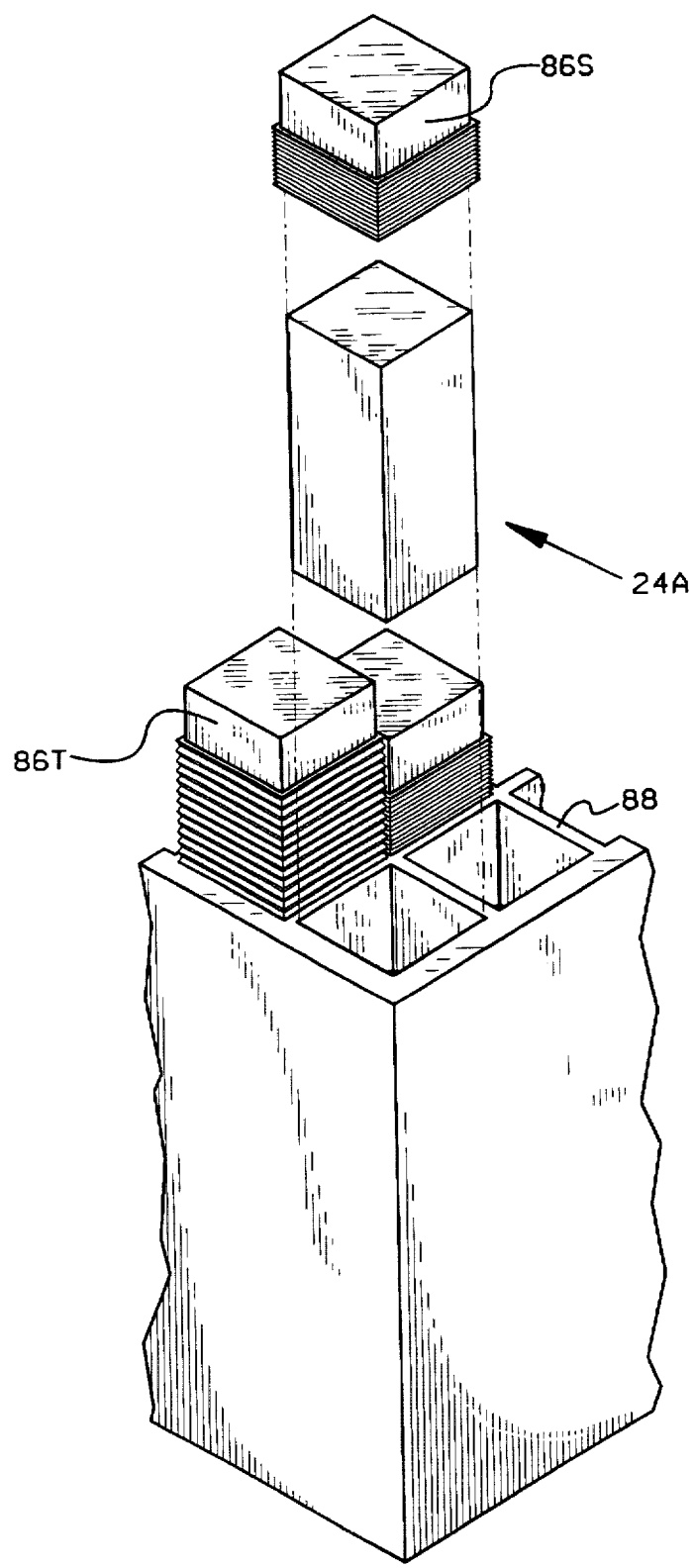
FIG. 18 is an exploded pictorial view of part of the device with a display support grid 88 and display covers 86S (collapsed) and 86T (extended).

The design of the display cover 86 is of the same form as the display shape 24. Said display cover 86 would be composed of a flexible transparent or translucent material and would fit over the top of the display shape 24 as depicted in FIG. 18. The lower portion of the display cover 86 would be corrugated to allow the cover to expand and contract with the movement of the display shape 24. These display covers 86 could be mounted on a support grid 88. This support grid 88 would be a reticulated structure of walls substantially parallel to the sides of the display shapes 24. The shape of the openings in the support grid 88 would substantially match that Of the particular display shape 24 in the opening. The depth of the grid walls would extend from the top surface of the display shape when it is at its lowest position down to a depth necessary to sufficiently support the sealing devices, as well as perform any other function needed, such as supporting circuitry, counteracting torque upon actuation of the display shapes 24, or any other duty required. The structure and material of said support grid 88 would be such that it can adequately perform any function required of it in a particular application. Surfaces of said support grid 88 in contact with the moving portions of said Three-Dimensional Displays 28 can be coated with a low-friction coating, or manufactured of a low-friction material. The bellows-shaped portion of each display cover 86 would be attached to said support grid 88 in such a manner as to encase each display shape 24, thus forming a contiguous seal to exclude moisture and other contaminants.

Figure 19:
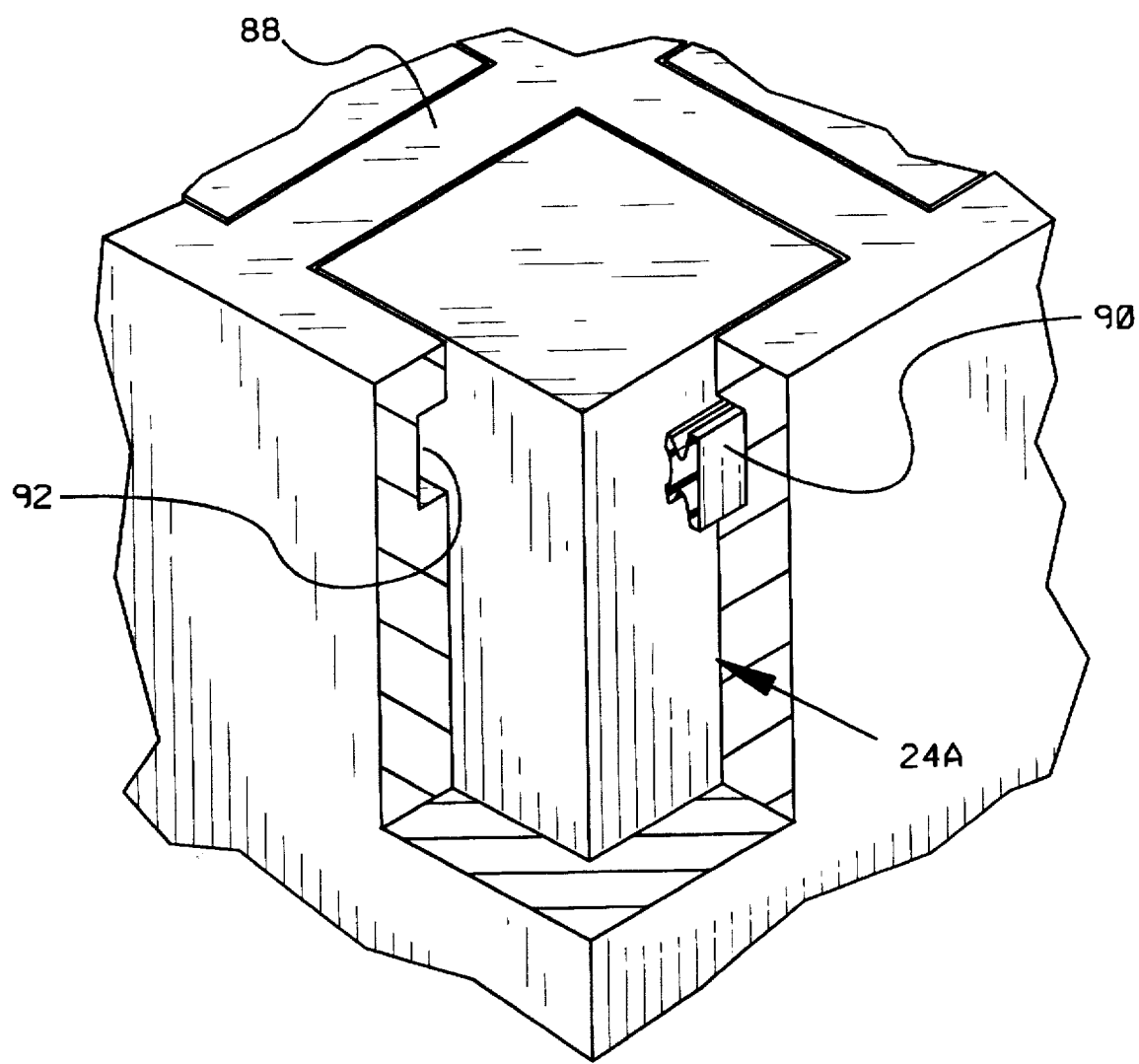
FIG. 19 is a pictorial cutaway view of part of the device with support grid 88 and display shape seal 90 around the display shape 24A.

Another means of sealing the device would be a system of sealing grooves 92 cut into the sides of the support grid 88 as shown in FIG. 19. Strips of a flexible sealing material 90 would be fit into said sealing grooves 92 in said support grid 88. The form of the display seal 90 would be such that it would bear against both the display shape 24 and the sealing groove 92, thus preventing the entry of moisture and other contaminants by virtue of direct contact. Exemplary materials for the seal 90 would be rubber or other similar elastomers that have sufficient flexibility to seal between the display shape 24 and support grid 88.

OPERATION OF THE INVENTION

In essence, the Three-Dimensional Display 28 can act as a two-way conduit for information and control between operator and machine. Towards this end, the operation of the invention will be two-fold. First, the central processor 30 will present information to the user by signalling the visual display driver circuits 32 and actuator driver circuits 34 to form visual and three-dimensional representations via the visual display means 38 and the actuating means 46. Second, the user can confer data and commands back to the machine through the input sensing means 48 and input interface circuits 36. At this point, the actuating means 46 could also be used to provide a tactile feedback to the operator by causing the displays to move in response to the information input by the user.

Data sent from the central processor 30 to the display driver circuits 32 includes information concerning which Three-Dimensional Displays 28 need to change what they currently display, as well as what new information is to be displayed. This governs the two-dimensional visual display information emanating from the invention. Along with this is sent data for the actuator driver circuits 34. This includes information concerning which displays are to move, in which direction they are to move, and what distance they should move. This provides the three-dimensional information to the user. While this is occurring, the central processor 30 must also scan for signals from the input interface circuits 36 indicating information being entered by the user via the input sensing means 48. This data is analyzed by the central processor to relate the positions of the displays sending the signals in; as well as possibly the location on the element of the signal, or even the type of input or degree of force; to the controlling software, thereby determining the resulting action required. Thus a loop is formed involving the output of visual and three-dimensional information from the device to the user and the input of data or commands from the user to the device, which in turn creates more output, and the cycle continues. In situations where user input is not desired, the input sensing means 48 and the input interface circuits 36 would be eliminated, and the central processor 30 would only interface with the display driver circuits 32 and actuator driver circuits 34.

Aside from the geometry and movement of the display shapes 24, the software that would control the central processor 30 will be the sole determinant of the uniqueness of the visual and tactile interaction of an operator with the invention. This software will completely determine the configuration of the function the device is performing. Therefore, to change the application for which a device is utilized, one need only change the software controlling it. This allows for easy changes in features, commands, or functions. The device could also be easily configured to the individual user as to complexity and control function placement. The interface could be software configured to particular requirements and choices, and could potentially even learn a particular user's preferences and methods and adapt itself to better serve the user.

Therefore, a versatile system is provided allowing visual and physical representation, and optionally two-way communication between operator and machine, in a manner more easily understood by humans: three-dimensional representation. The addition of the third dimension to human/machine communications vastly increases the number of potential applications, making the uses for this invention almost limitless. The present invention can be applied to many different technologies due to its variable nature. To this end, the above descriptions should not be construed as limitations of the scope of the invention, but rather as exemplary embodiments thereof. Many other variations and combinations are possible.

We claim:

1. A three-dimensional display comprising:
    a display shape comprising:
        (i) visual display means
        (ii) supporting means for said visual display means
    actuation means engaged with said display supporting means for the purpose of imparting motion to said display shape
    means for conducting signals to and from said visual display means and said actuation means.

2. The display according to claim 1 wherein said actuation means is a rotary stepper motor with a threaded lead screw shaft, and said display supporting means contains threads to substantially match those of said lead screw shaft.

3. The display according to claim 1 wherein said visual display means further comprises at least one liquid crystal display element.

4. The display according to claim 1 wherein said visual display means further comprises at least one light emitting diode element.

5. The display according to claim 1 wherein said actuation means further comprises at least one piezoelectric element.

6. The display according to claim 1 wherein said actuation means further comprises at least one magnetostrictive element.

7. The display according to claim 1 further including means for excluding external contaminants.

8. The display according to claim 1 further including means for determining the current position of and distance travelled by said display shape.

9. A three-dimensional display comprising:
    a display shape comprising:
        (i) visual display means
        (ii) supporting means for said visual display means
    actuation means engaged with said display supporting means for the purpose of imparting motion to said display shape
    input sensing means
    means for conducting signals to and from said visual display means, said actuation means, and said input sensing means.

10. The display according to claim 9 wherein said actuation means is a rotary stepper motor with a threaded lead screw shaft, and said display supporting means contains threads to substantially match those of said lead screw shaft.

11. The display according to claim 9 wherein said visual display means further comprises at least one liquid crystal display element.

12. The display according to claim 9 wherein said visual display means further comprises at least one light emitting diode element.

13. The display according to claim 9 wherein said actuation means farther comprises at least one piezoelectric element.

14. The display according to claim 9 wherein said actuation means further comprises at least one magnetostrictive element.

15. The display according to claim 9 wherein said input sensing means is a capacitance type much switch.

16. The display according to claim 9 wherein said input sensing means comprises means for detecting feedback from said actuation means indicating the presence of pressure on said display shape.

17. The display according to claim 9 further including means for excluding external contaminants.

18. The display according to claim 9 further including means for determining the current position of and distance travelled by said display shape.

19. A three-dimensional display array comprising:

a plurality of three-dimensional displays, each of which further comprises:
  (i) a display shape comprising:
    a) visual display means
    b) means for supporting said visual display means
  (ii) actuation means engaged with said display supporting means for the purpose of moving said display shape
  (iii) means for conducting signals from appropriate circuitry to said visual display means and said actuation means appropriate circuitry comprising:
  (i) a central processing unit
  (ii) means for driving said visual display means
  (iii) means for driving said actuation means.

20. The display array according to claim 19 wherein said actuation means for each of said three-dimensional displays is a rotary stepper motor with a threaded lead screw shaft, and said display supporting means for each of said three-dimensional displays contains threads to substantially match those of said lead screw shaft.

21. The display array according to claim 19 wherein said visual display means for each of said three-dimensional displays further comprises at least one liquid crystal display element.

22. The display array according to claim 19 wherein said visual display means for each of said three-dimensional displays further comprises at least one light emitting diode element.

23. The display array according to claim 19 wherein said actuation means for each of said three-dimensional displays further comprises at least one piezoelectric element.

24. The display array according to claim 19 wherein said actuation means for each of said three-dimensional displays further comprises at least one magnetostrictive element.

25. The display array according to claim 19 further including means for excluding external contaminants from said array.

26. The display array according to claim 19 further including means for determining the current position of and distance travelled by said display shape for each of said three-dimensional displays.

27. A three-dimensional display array comprising:

a plurality of three-dimensional displays, each of which further comprises:
  (i) a display shape comprising:
    a) visual display means
    b) means for supporting said visual display means
  (ii) actuation means engaged with said display supporting means for the purpose of moving said display shape
  (iii) input sensing means
  (iv) means for conducting signals between appropriate circuitry and said visual display means, said actuation means, and said input sensing means appropriate circuitry comprising:
  (i) a central processing unit
  (ii) means for driving said visual display means
  (iii) means for driving said actuation means
  (iv) means for interfacing with said input sensing means.

28. The display array according to claim 27 wherein said actuation means for each of said three-dimensional displays is a rotary stepper motor with a threaded lead screw shaft, and said display supporting means for each of said three-dimensional displays contains threads to substantially match those of said lead screw shaft.

29. The display array according to claim 27 wherein said visual display means for each of said three-dimensional displays further comprises at least one liquid crystal display element.

30. The display array according to claim 27 wherein said visual display means for each of said three-dimensional displays further comprises at least one light emitting diode element.

31. The display array according to claim 27 wherein said actuation means for each of said three-dimensional displays further comprises at least one piezoelectric element.

32. The display array according to claim 27 wherein said actuation means for each of said three-dimensional displays further comprises at least one magnetostrictive element.

33. The display array according to claim 27 wherein said input sensing means for each of said three-dimensional displays is a capacitance type touch switch.

34. The display array according to claim 27 wherein said input sensing means for each of said three-dimensional displays comprises means for detecting feedback from said actuation means indicating the presence of pressure on said display shape.

35. The display array according to claim 27 further including means for excluding external contaminants from said array.

36. The display array according to claim 27 further including means for determining the current position of and distance travelled by said display shape for each of said three-dimensional displays.

* * * * *